W. C. CRAWFORD.
DETACHABLE HANDLE.
APPLICATION FILED AUG. 15, 1916.
1,236,678.
Patented Aug. 14, 1917.
2 SHEETS—SHEET 1.
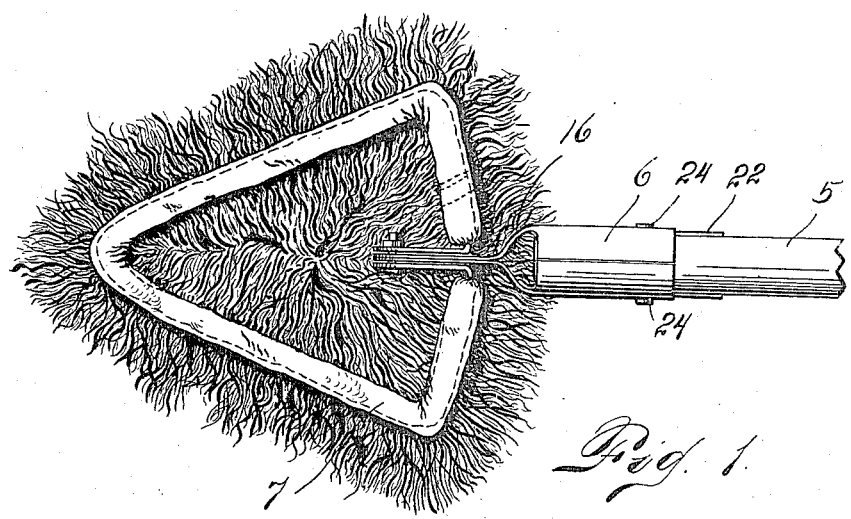
Fig. 1.
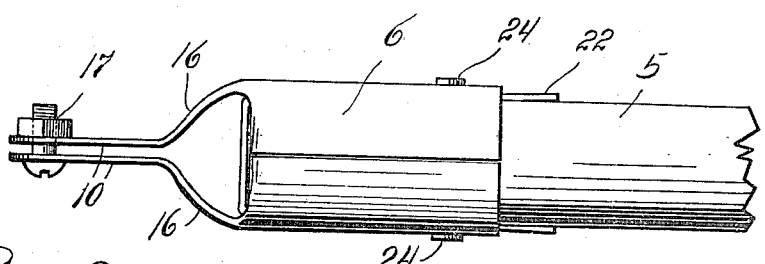
Fig. 2.
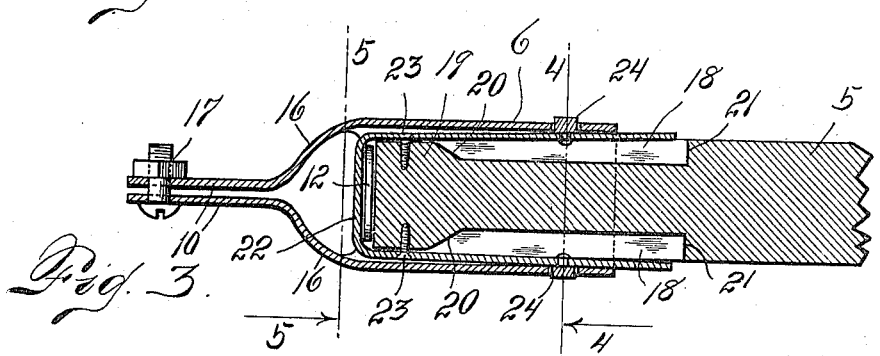
Fig. 3.
Inventor
Wesley C. Crawford.
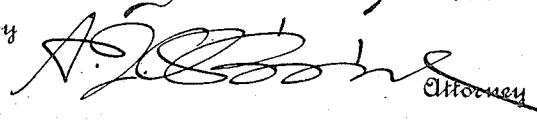
Attorney W. C. CRAWFORD.
DETACHABLE HANDLE.
APPLICATION FILED AUG. 15, 1916.
1,236,678.
Patented Aug. 14, 1917.
2 SHEETS—SHEET 2.
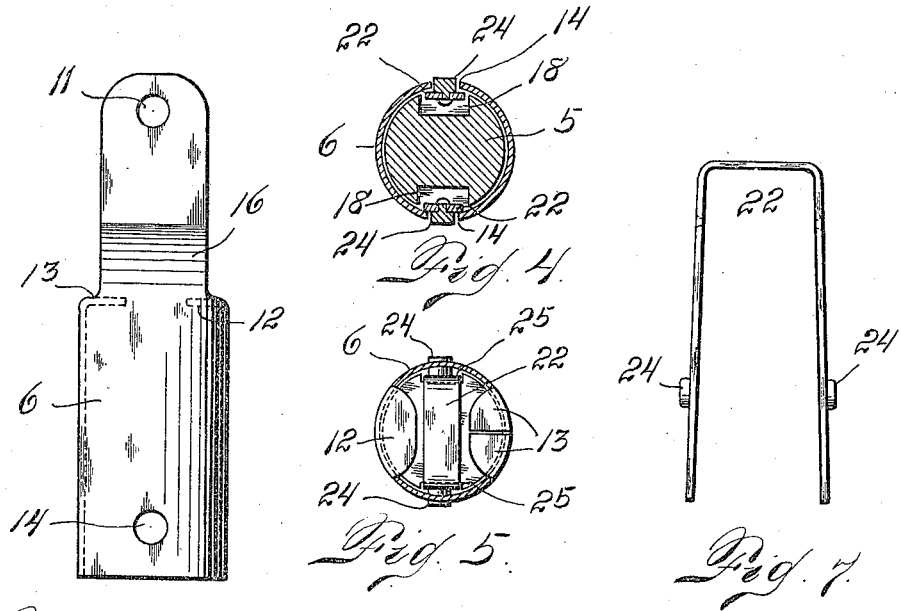
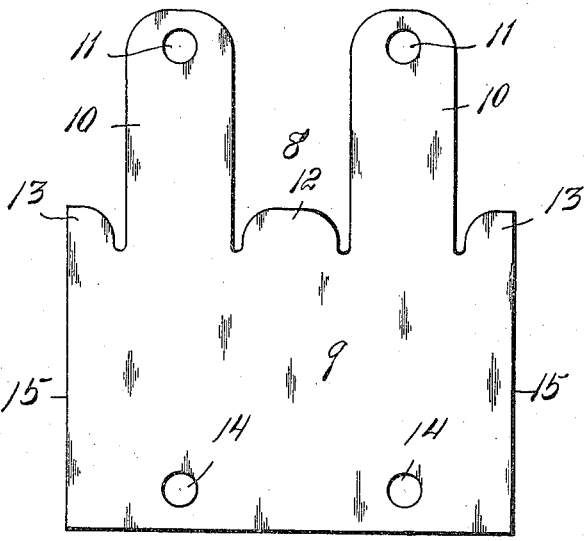
Inventor
Wesley C. Crawford.
By
Attorney

UNITED STATES PATENT OFFICE.

WESLEY C. CRAWFORD, OF DENVER, COLORADO.

DETACHABLE HANDLE.

1,236,678.     Specification of Letters Patent.     Patented Aug. 14, 1917.

Application filed August 15, 1916. Serial No. 114,993.

*To all whom it may concern:*

Be it known that I, WESLEY C. CRAWFORD, a citizen of the United States, residing at the city and county of Denver and State of Colorado, have invented certain new and useful Improvements in Detachable Handles; and I do declare the following to be a full, clear, and exact description of the invention, such as will enable others skilled in the art to which it appertains to make and use the same, reference being had to the accompanying drawings, and to the characters of reference marked thereon, which form a part of this specification.

The present invention relates to detachable handles for mops, brooms or other implements, the principal object of the invention being to provide a handle and means for detachably securing the same to the head of a mop, broom, etc.

A further object of the invention consists in the provision of a fastening connection whereby the handle may be firmly united to the socket carrying the mop and yet conveniently disconnected at any time.

A still further object of the invention consists in providing a fastening of the type referred to which includes spring pressed means, carried on the end of the handle and adapted to enter the mop socket and have interlocking engagement therewith.

A still further object of the invention consists in providing a removable handle for mops which can be easily and quickly detached from the mop head socket without the necessity of handling the mop itself.

With these and other objects in view the invention consists in the combination and arrangement of parts, more fully set forth in the following specifications, illustrated in the accompanying drawings and more particularly pointed out in the appended claims.

In the drawings:

Figure 1, plan view of removable handle according to the present invention shown attached to a mop, part of the handle being broken away.

Fig. 2, is view showing in elevation the socket of a mop or like implement with which a removable handle according to the present invention is in interlocking engagement.

Fig. 3, is a transverse longitudinal section of the parts shown in Fig. 2.

Fig. 4 is a transverse section taken on the line 4—4 of Fig. 3, looking in the direction of the arrow.

Fig. 5 is a similar view on the line 5—5 of Fig. 3, looking in the direction of the arrow.

Fig. 6 is view of the holding socket detached, shown in front elevation.

Fig. 7 is view in side elevation showing the inner spring member removed from the socket and handle, and Fig. 8 is a development of the metal blank from which the socket is made.

Referring now to the drawings, the handle 5, which may be of wood or any suitable material, has its end engaging a metal socket 6 to which the mop head 7 is fixedly secured. The handle is preferably cylindrical in shape as here shown. Referring to Fig. 8 it will be seen that the socket 6 may be formed from a single piece of sheet metal stamped or cut to shape required. The blank 8 comprises a body member 9 having a pair of parallel extensions 10 formed integral therewith, each of which is perforated at 11 adjacent its end. The metal between the extensions 10 is cut to form a rounded projection or ear 12, the purpose of which will hereinafter appear. At either side of the blank 8 additional ears or lugs of metal 13 are provided of such size and shape that as the socket blank is bent into circular form the two together form a split lug similar to 12. A pair of perforations 14 are formed in the blank 8 at points near the lower edge thereof and in alinement with the perforations 11 of the extensions 10. The blank 8 is rolled into the form of a split cylinder with the parallel edges 15 contiguous one another. The extensions 10 are curved or bent inwardly toward each other as indicated at 16 and in the parallel extensions forming the supporting member for the mop head which is secured thereto by means of the bolt and nut 17 engaging the perforations 11. The ear or lug 12, and the half lugs 13, are bent inwardly at right angles to the body 9 to form stops for limiting the inward movement of the handle end.

Referring now to Fig. 5, it will be seen that the handle 5 is provided with longitudinal slots or recesses 18 formed at opposite sides adjacent the circular end portion 19. The slots are formed with inclined surfaces 20 at their forward ends and they extend rearwardly terminating in shoulders 21 some little distance beyond the end of the socket body 9.

A U-shaped spring member 22 formed of flat leaf spring is provided as shown in Fig. 7 and is adapted to extend around the end of the handle 5 and along either side, being permanently secured in grooves 25 formed in the circular part 19 by screws 23. The free ends of the spring 22 lie normally over the longitudinal recesses 18 and they are each provided with a circular lug or protuberance 24 adapted to register with the perforations 14 of the socket body member 6. The free ends of the springs 22 extend beyond the end of the socket member 6 so as to be readily accessible for the purpose of removing the handle 5.

Assuming the mop head 7 to be attached by the bolt and screw 17 to the extending parallel ears or plates 10 and it is desired to attach the handle 5 to the mop head, it is only necessary to insert the end of the handle 5 within the body member 9 of the socket 6 until the circular part 19 abuts the inturned lugs or ears 12 and 13 which act as stops against further movement. It will be seen that during this operation the leaf springs 22 will be depressed by the frictional engagement of the lugs 24 with the inner wall of the member 6, the springs bending down along the inclines 20 of the recesses 18. The handle 5 is then turned about its longitudinal axis until the lugs 24 register with the perforations 14 and snap into place effecting an interlocking relation of the parts which is securely maintained under spring tension.

It will be understood from the foregoing description that there can be no lateral, longitudinal or rotational movement of the handle 5 in relation to the socket 6 and as suitable bearings are provided along either side and at the end of the handle part which enters the socket, a strong and secure fastening device is obtained.

In order to remove the handle 5 from the mop head the two projecting free ends of the leaf springs 22 are simultaneously pressed inwardly by the thumb and forefinger of one hand until the lugs 24 are completely disengaged from the perforations 14, when the handle 5 can be quickly and easily withdrawn entirely from the socket.

While the invention is preferably used for providing a detachable connection between a mop head and its handle, it will be understood that it is equally applicable to other implements as for example, brooms, hoes, rakes or the like.

Having described my invention what I claim is:

1. In a detachable handle, the combination of a socket, a handle having an end portion adapted to enter the socket, spring pressed locking means for maintaining the end of the handle in locked relation within the socket, said means having parts accessible beyond the end of the socket for releasing the interlocking engagement of the parts.

2. In a detachable handle, the combination of a socket, a handle having an end portion adapted to enter the socket, inwardly projecting stops at the inner end of said socket formed integral therewith for limiting the inward movement of the handle within the socket and spring means carried on the end of said handle for engaging said socket to prevent relative movement of the two.

3. In a detachable handle, the combination of a socket provided with perforations, a handle adapted to enter said socket, a U-shaped spring member carried on the end of said handle, the legs of said member each provided with a lug adapted to enter said perforations, the free ends of said legs being accessible beyond the end of the socket for releasing the interlocking engagement of the parts.

4. In a detachable handle the combination of a tubular socket provided with oppositely disposed perforations near its outer end, a handle adapted to enter said socket, a U-shaped spring member fixedly carried on the end of said handle, the two extremities of said spring member extending rearwardly beyond the tubular socket and provided with lugs adapted to enter said perforations to prevent relative movement between the socket and handle.

In testimony whereof I affix my signature, in presence of two witnesses.

WESLEY C. CRAWFORD.

Witnesses:
H. A. VILLEMAGNE,
A. J. O'BRIEN.

Copies of this patent may be obtained for five cents each, by addressing the "Commissioner of Patents, Washington, D. C."